Oct. 14, 1924.
F. J. ARADO
CHOPPED NUT DISPENSER
Filed Feb. 19, 1923
1,511,821
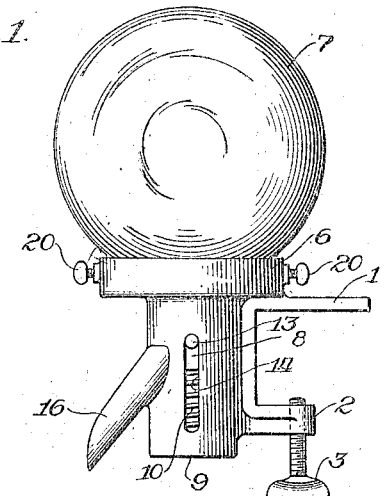
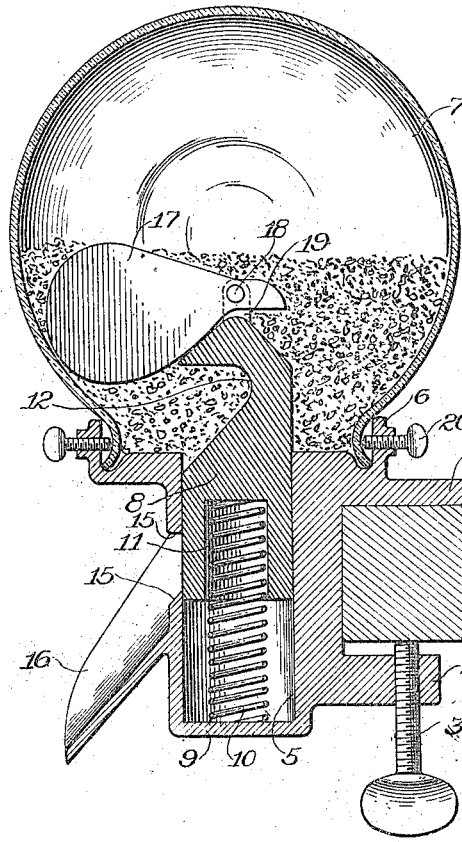
Inventor:
Frank J. Arado
by Albert Scheith
Attorney Patented Oct. 14, 1924.

1,511,821

UNITED STATES PATENT OFFICE.

FRANK J. ARADO, OF CHICAGO, ILLINOIS, ASSIGNOR TO THE UNITED FIG & DATE COMPANY, OF CHICAGO, ILLINOIS, A CORPORATION OF ILLINOIS.

CHOPPED-NUT DISPENSER.

Application filed February 19, 1923. Serial No. 619,911.

*To all whom it may concern:*

Be it known that I, FRANK J. ARADO, citizen of the United States, residing at Chicago, Illinois, have invented certain new and useful Improvements in a Chopped-Nut Dispenser; and I do hereby declare the following to be a full, clear, and exact description of the invention, such as will enable others skilled in the art to which it appertains to make and use the same.

My invention relates to dispensing appliances and in general to a simple and conveniently operated appliance for measuring out a predetermined quantity of material from a container for the same.

For these general purposes, my invention provides a simple, inexpensive and compact appliance which can easily be operated even by inexperienced parties for measuring out a predetermined quantity of material and for causing such measured quantity to flow out in a given direction. Moreover, my invention provides an appliance of this kind in which the casing of the measuring arrangement supports the container for the material, and in which both the quantity of available material, the condition of this material and the ready flow of the same is always visible. It also provides simple and automatically operating means for stirring up the stored material during every measuring out of a quantity of the same, and desirably provides stirring means for this purpose so arranged as to engage a portion of the container for detaching adjacent portions of material which might stick to the interior of the container. For this latter purpose, my invention desirably provides a combined stirring and scraping member carried by a movable portion of the measuring device, and provides a mounting for the container which will readily permit the container to be rotated with respect to the scraping member so as to cause the latter to scrape and clean a portion of the container. Still further and also more detailed objects will appear from the following specification and from the accompanying drawings, in which—

Fig. 1 is an elevation of a material storing and dispensing appliance embodying my invention.

Fig. 2 is an enlarged central and vertical section through the same appliance, showing this as it appears when the measuring plunger is in its normal, raised and material-receiving position.

Fig. 3 is a section similar to the lower portion of Fig. 2 but showing the measuring plunger in its depressed or material-discharging position.

Fig. 4 is a perspective view of the main movable portions of the appliance, namely the measuring plunger with the scraping and stirring vane pivoted to its top and with the actuating handle screwed into its side.

In preparing so called nut sundaes at soda fountain stands, it is customary to sprinkle a quantity of chopped nut meats over the ice cream. If this measuring is done by dipping a spoon into a jar of the nut meats, the quantity secured varies considerably according to the height at which the nut meats are piled up on the spoon, so that the desired uniformity is not obtained. Furthermore, the spoons used for such purposes are not always kept in the desired highly sanitary condition (particularly when the dispensing clerks are pressed for time) and the opening of the jars to the air admits an undue amount of humidity on damp days, thereby causing the nut meats to stick to the jar and also interfering with the desired sprinkling of the chopped nut meats over the ice cream or other preparation on which they are to be spread. Moreover, if jars of any considerable depth are used, the clerk in reaching toward the bottom of the jar is apt to have his hand or wrist engage the interior of the jar, which is undesirable for sanitary reasons. So also, the time spent in uncovering the jar, picking up a spoon or in setting it down again all counts up on rush days and desirably should be saved.

In one of its immediate commercial aspects, my invention provides an appliance particularly well suited for measuring out chopped nut meats and for feeding the measured quantity directly upon the dish on which it is to be spread, while continually maintaining the supply of the nut meats in a closed receptacle and while saving considerable time for the user. I am therefore illustrating and describing my invention in an embodiment well adapted for this purpose, although I do not wish to be limited to the particular form shown or to the above mentioned use of the novel appliance of my invention.

In the embodiment of the drawings, my appliance includes a body or supporting member, here shown as a casting having a horizontal projecting ledge 1 adapted to rest on the top of a table or shelf 4 adjacent to the edge thereof, and also having a projecting lug 2 carrying a clamping screw 3 adapted to clamp the appliance firmly to the table top or shelf. Extending vertically downward into this body or supporting member is a cylindrical bore 5 which is concentric with a holder ring 6 corresponding in the size of its bore to the downwardly directed mouth of a glass bowl or receptacle 7 which serves as the container for the chopped nut meats.

Slidably mounted in the bore 5 of the supporting member is a measuring member 8 in the form of a plunger which has its lower end normally raised considerably above the bottom 9 of the said bore by a compression spring 10, the spring being desirably guided by having its upper portion socketed in a bore 11 extending upwardly into the measuring member 8 from the bottom of the latter after the manner shown in Fig. 2. This measuring member has a lateral recess 12, which recess is disposed largely above the top of the supporting member and within the container 7 when the measuring member or plunger 8 is in its normal raised position after the manner of Fig. 2, so that the container then opens into the recess and permits the nut meats to flow into the recess. Threaded into one side of the plunger 8 is a stem 13 which projects through a vertical slot 14 in the supporting member as shown in Fig. 1 and which normally engages the upper end of that slot so as to limit the upward movement of the measuring plunger. By pressing downwardly on this stem or handle 13, which forms a manually operable actuating member, the plunger can readily be lowered to the position of Fig. 3, thereby bringing the mouth of the recess 12 opposite a lateral opening 15 in the body or supporting member. This lateral opening 15 alines with a downwardly inclined chute 16 arranged for guiding the material discharged through the said opening.

When the plunger is thus depressed, the portion of the plunger above the recess enters the bore 5 of the supporting member, so that the quantity of material discharged through the opening 15 is governed by the size of the recess 12, or in other words by the volume of metal which has been cut out of the substantially cylindrical plunger 8. By suitably proportioning this recess, I can readily adjust the measured quantity of material to suit the particular requirements, thereby avoiding any variations in the measuring. To prevent the plunger from being depressed beyond the proper alining of the recess with the lateral outlet, I desirably provide the body or supporting member with a suitable stop, as for example by having the bottom of the plunger engage a bottom wall 8 when the plunger has been adequately depressed. Furthermore, since the user merely has to depress the handle 13 against the resistance of the spring 10 and can then let the spring return the measuring plunger to its normal position, the entire measuring operation can be performed in a small fraction of the time which is required for hunting up a spoon, opening a jar, reaching into the jar, and carefully raising the spoon out of the jar to avoid spilling part of its contents.

At the same time, since the container or jar 8 is continuously kept closed, the effect of humidity in damp weather is negligible and the contents are readily kept in a proper sanitary condition. By using a glass globe or jar for this container, the actual condition of the stored material and the quantity of the latter can always be seen at a glance, and the attractiveness of the continually visible contents acts as a further stimulant to the ordering of mixtures in connection with which they are used. However, even the oiliness of such materials as chopped nut meats may tend to make these stick to each other and to the inside of the container, thereby interfering more or less with the ready dispensing of the exact quantity desired. To overcome this difficulty, I desirably also provide automatic means for stirring up the contents of the container with every reciprocation of the measuring plunger, and particularly for loosening and stirring the material adjacent to the mouth of the recess in the measuring plunger. This I desirably do by pivoting a flat vane 17 to the top of the plunger in such a manner that the vane will have its face substantially upright and extending approximately radial of the common axis of the container and the plunger. The pivot pin 18 as used for mounting the vane desirably extends through a raised tip 19 on the top of the plunger and the vane is so shaped that it can swing through a considerable angle about its said pivot. With the vane or scraper 17 thus arranged, it will be obvious from Figs. 2 and 3 that the depressing of the plunger causes the vane to cut through the material which will be opposite the recess of the plunger when the plunger returns to its raised position, and that both the tip of the plunger and the vane will cooperate during the lifting of the plunger in also stirring up a considerable portion of the balance of the material in the container. The normal operation of the measuring plunger will therefore be sufficient with most materials for stirring up the contents of the container to insure a uniform measuring out of the desired quantity.

By employing a vane which extends substantially radially of the container, I can also make this act as an effective scraper for the lower wall portions of the container upon a rotation of the container itself within its holder 6. When in ordinary use, the screws 20 which are threaded through the holder ring 6 opposite the neck of the container need not be tightened sufficiently to clamp the container itself, hence the container can readily be rotated by hand to cause the vane 16 to scrape off any material tending to stick to the lower portion of the container walls, a corresponding rotation of the vane and plunger being prevented by the projecting of the stem or handle 13 through the relatively narrow slot 14.

Whenever the container is aproximately empty, the entire appliance can readily be detached from the table or shelf by loosening the clamping screw 3, after which the entire appliance can be inverted and the container can be detached from the holder ring by merely loosening the screws 20. Access to the interior of the container is thus afforded for filling it with a fresh charge of material, and also for cleaning the container if desired, after which the body or supporting member of the appliance is again attached to the glass container while the latter is still inverted.

However, while I have illustrated and described my appliance in an embodiment designed for a clamping attachment to a table top or shelf and including a substantially spherical globe as the container portion, a handle normally engaging a slot wall to limit the movement of the measuring member in one direction, and a body formation engaging the measuring member to stop its movement in the opposite direction, I do not wish to be limited to these or other details of the construction and arrangement here disclosed. Obviously, many changes might be made without departing either from the spirit of my invention or from the appended claims.

I claim as my invention:—

1. A dispensing appliance comprising a container, a measuring member having a chambered portion reciprocable into and out of the container, an agitator movably mounted on the measuring member and engaging the bore of the receptacle so as to be moved about its mounting upon movement of the measuring member, and a mounting for the receptacle and measuring member, the said mounting being arranged to permit the receptacle to be rotated with respect to the measuring member so as to cause the agitating member to scrape the inner surface of the receptacle.

2. A dispensing appliance comprising a downardly open receptacle, a support connected to the receptacle at its mouth and with respect to which the receptacle can be rotated, a measuring plunger movably mounted in the support, means for preventing rotation of the measuring plunger with respect to the support, and an agitating vane pivoted upon the plunger and disposed within the receptacle and in continuous edgewise engagement with the bore of the receptacle.

3. A dispensing appliance comprising a downardly open receptacle, a support connected to the receptacle at its mouth and with respect to which the receptacle can be rotated, a measuring plunger movably mounted in the support, means for preventing rotation of the measuring plunger with respect to the support, and an agitating vane pivoted upon the plunger and disposed within the receptacle and in continuous edgewise engagement with the bore of the receptacle, the agitating member comprising a relatively thin vane having its face portions disposed substantially in a plane parallel to the line of movement of the plunger.

4. A dispensing appliance comprising a downardly open receptacle, a support connected to the receptacle at its mouth and with respect to which the receptacle can be rotated, a measuring plunger movably mounted in the support, means for preventing rotation of the measuring plunger with respect to the support, and an agitation vane pivoted upon the plunger and disposed within the receptacle and in continuous edgewise engagement with the bore of the receptacle, the agitating member comprising a relatively thin vane having its face portions disposed substantially in a plane parallel to the line of movement of the plunger, the plunger being mounted coaxial with the receptacle and the pivotal mounting of the agitating member having its axis transverse of the common axis of the receptacle and plunger.

5. A measuring appliance comprising a receptacle having a downwardly open mouth, a stationary member connected to the mouth of the receptacle and arranged for supporting the receptacle while permitting rotation of the receptacle about its own axis, a measuring plunger having its measuring portion movable into and out of the receptacle, the said plunger having its axis coaxial with the receptacle, and an agitating vane pivoted upon the inner end of the measuring plunger and extending substantially in a plane passing through the said axis and extending in one direction from the said axis, the vane having an arm extending in the other direction from the said axis and disposed for engaging the measuring member to limit the pivotal movement of the vane about its pivotal mounting in one direction.

6. A measuring appliance comprising a receptacle, a support associated with the receptacle at its mouth and with respect to which the receptacle is rotatable, a measuring plunger mounted in the support for reciprocable movement and having a chambered portion adapted to be moved into and out of the receptacle upon reciprocation of the plunger, means for preventing the plunger from rotating with respect to the support, and a vane pivoted to the inner end of the plunger on an axis transverse of the plunger and having its face portions substantially at right angles to the axis of its said pivotal mounting, the vane having its free end in engagement with the bore of the receptacle so as to be moved about its said pivotal mounting by the movement of the plunger with respect to the receptacle.

7. A dispensing appliance comprising a downwardly open container, a body member connected to the container and having a bore extending downwardly from the opening of the latter and having a lateral outlet connected to the said bore, a plunger slidably mounted in the said bore and having a lateral recess, spring means normally holding the plunger in a position in which the said recess opens into the container, manually operable means for moving the plunger against the resistance of the spring to a position in which the said recess is open to the said lateral outlet, and a stirring vane pivoted to the upper end of the plunger on a substantially horizontal axis, the vane having a substantially upright face.

8. A dispensing appliance comprising a downwardly open container, a body member connected to the container and having a bore extending downwardly from the opening of the latter and having a lateral outlet connected to the said bore, a plunger slidably mounted in the said bore and having a lateral recess, spring means normally holding the plunger in a position in which the said recess opens into the container, manually operable means for moving the plunger against the resistance of the spring to a position in which the said recess is open to the said lateral outlet, and a stirring and scraping vane carried by the upper end of the plunger and connected to the plunger for up-and-down movement, the said vane being substantially flat and having an edge portion shaped for scraping engagement with the bore of the container.

9. A dispensing appliance comprising a downwardly open container, a body member connected to the container and having a bore extending downwardly from the opening of the latter and having a lateral outlet connected to the said bore, a plunger slidably mounted in the said bore and having a lateral recess, spring means normally holding the plunger in a position in which the said recess opens into the container, manually operable means for moving the plunger against the resistance of the spring to a position in which the said recess is open to the said lateral outlet, the connection between the body member and the container being arranged to permit relative rotation thereof about the axis of the plunger, and a stirring and scraping member movably mounted on the plunger and having one edge thereof formed for scraping engagement with the bore of the container.

Signed at Chicago, Illinois, Feb. 16th, 1923.

FRANK J. ARADO.